United States Patent
Tanaka et al.

(10) Patent No.: US 11,967,808 B2
(45) Date of Patent: Apr. 23, 2024

(54) WIRE HARNESS

(71) Applicant: SUMITOMO WIRING SYSTEMS, LTD., Yokkaichi (JP)

(72) Inventors: Kosuke Tanaka, Yokkaichi (JP); Ryuta Saito, Yokkaichi (JP); Katsutoshi Izawa, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/974,356

(22) Filed: Oct. 26, 2022

(65) Prior Publication Data

US 2023/0133401 A1    May 4, 2023

(30) Foreign Application Priority Data

Oct. 29, 2021   (JP) .................. 2021-177603

(51) Int. Cl.
*H02G 3/04*    (2006.01)
*B60R 16/02*   (2006.01)
*H01B 7/00*    (2006.01)

(52) U.S. Cl.
CPC ....... *H02G 3/0418* (2013.01); *B60R 16/0215* (2013.01); *H01B 7/0045* (2013.01); *H02G 3/0468* (2013.01)

(58) Field of Classification Search
CPC ............ B60R 16/0207; B60R 16/0215; H02G 3/0418; H02G 3/0468; H02G 3/0481; H01B 7/0045
See application file for complete search history.

(56) References Cited

U.S. PATENT DOCUMENTS

| | | | | |
|---|---|---|---|---|
| 7,278,190 B2 * | 10/2007 | Fischer | ................... | F16L 3/223 |
| | | | | 248/74.2 |
| 8,505,858 B2 * | 8/2013 | Hansen | ................. | F16L 3/1226 |
| | | | | 174/664 |
| 9,482,369 B2 * | 11/2016 | Sampson | ................ | F16L 3/127 |
| 2007/0128929 A1 * | 6/2007 | Oga | ....................... | F16L 3/1025 |
| | | | | 439/578 |
| 2014/0196929 A1 | 7/2014 | Okuhara | | |
| 2017/0133827 A1 * | 5/2017 | Sugino | ................. | H05K 9/0098 |
| 2019/0049142 A1 * | 2/2019 | Balakrishna | ............ | F24F 13/22 |

FOREIGN PATENT DOCUMENTS

FR    2880211 A1 *   6/2006   ............ F16L 3/1025
JP    2009038899 A *  2/2009   ............... H02G 3/30

* cited by examiner

*Primary Examiner* — Paresh Paghadal
(74) *Attorney, Agent, or Firm* — Oliff PLC

(57) ABSTRACT

A wire harness including; a wire harness main body including an electric wire and an outer cover enclosing an outer circumference of the electric wire; a route-regulating cover that is attached to an outer circumference of the outer cover and regulates a route of the wire harness main body; and an attachment attached to an outer circumference of a portion in a lengthwise direction of the route-regulating cover.

8 Claims, 8 Drawing Sheets

FIG. 8
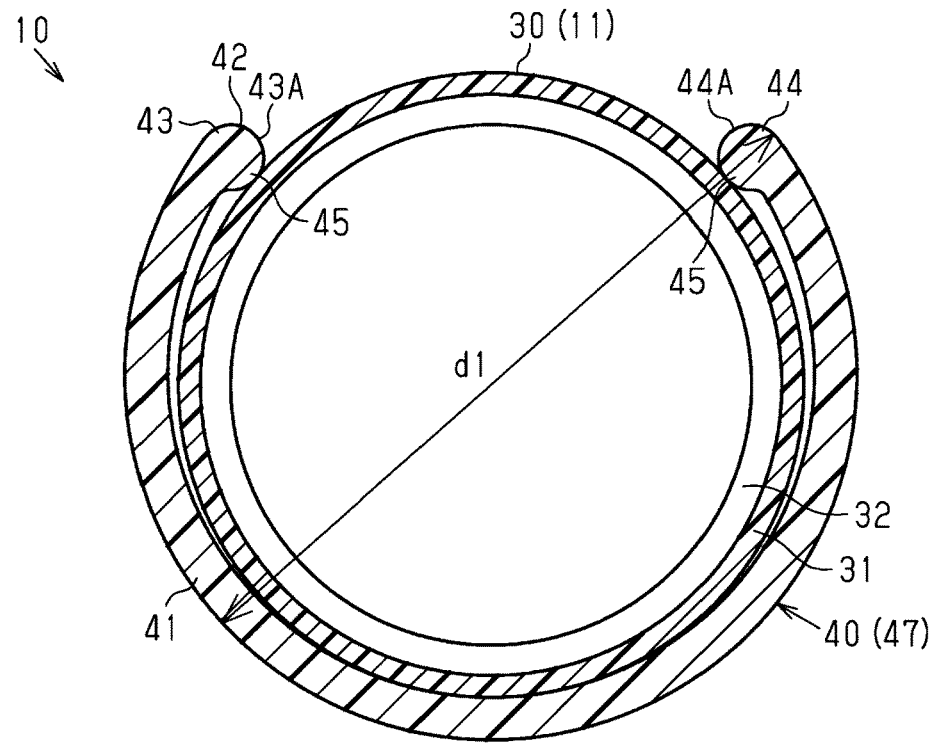
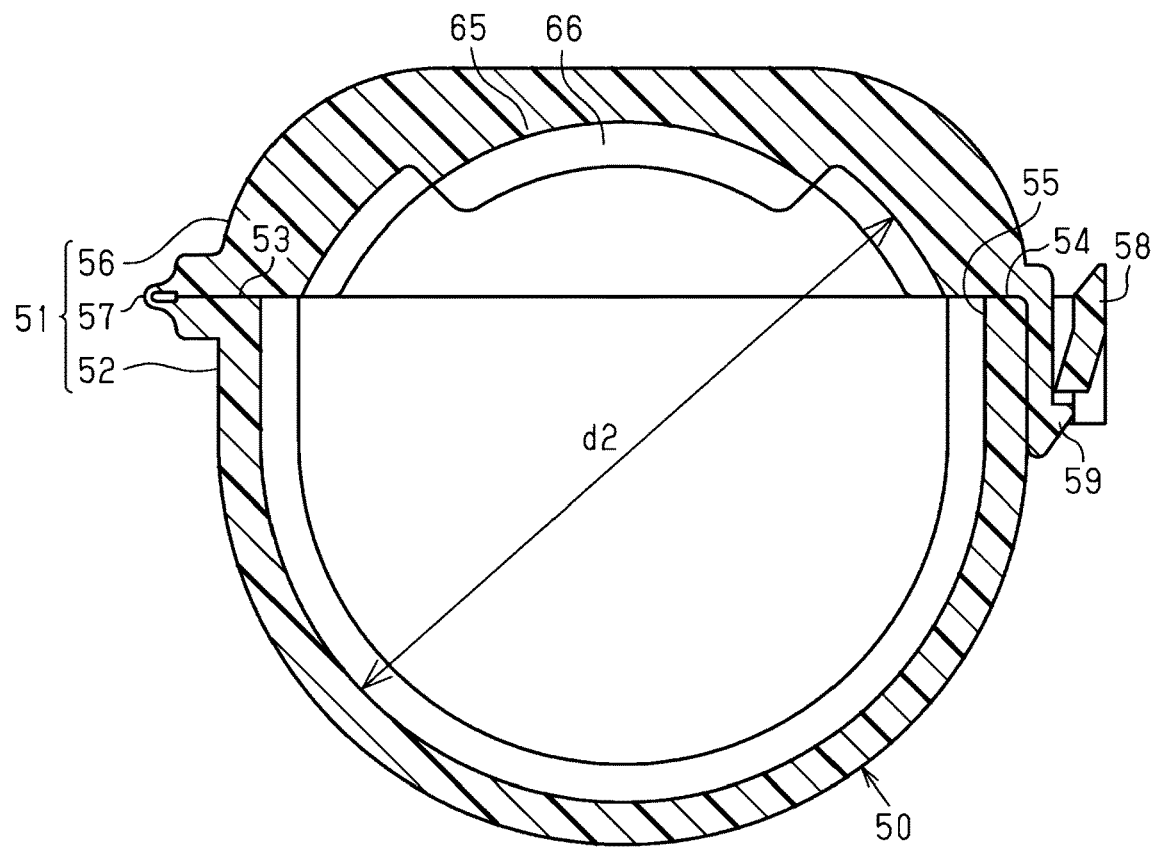

WIRE HARNESS

BACKGROUND

The present disclosure relates to a wire harness.

Conventionally, a wire harness that includes: a wire harness main body that includes an electric wire member and an outer cover member that covers the electric wire member; and a route-regulating member that is attached to an outer circumference of the outer cover member and is configured to regulate the route of the wire harness main body, has been known as a wire harness for a vehicle (for example, see JP 2013-55760A).

SUMMARY

Incidentally, in the above-described wire harness, it is desired to improve assembly workability, and there is still room for improvement from this point of view.

An exemplary aspect of the disclosure provides a wire harness capable of improving assembly workability.

The wire harness of the present disclosure includes: a wire harness main body including an electric wire and an outer cover enclosing an outer circumference of the electric wire; a route-regulating cover that is attached to an outer circumference of the outer cover and regulates a route of the wire harness main body; and an attachment attached to an outer circumference of a portion in a lengthwise direction of the route-regulating cover, wherein: the route-regulating cover includes a first main body that covers a portion of the outer circumference of the outer cover, and an insertion port that is open in a direction orthogonal to a lengthwise direction of the first main body and extends along an entire length in the lengthwise direction of the first main body, the route-regulating cover includes a connection that is connected to the attachment, the attachment includes a cover that covers an outer circumference of the connection, and the cover includes a regulating wall that is engageable with an end surface in the lengthwise direction of the route-regulating cover in a lengthwise direction of the wire harness main body.

According to the wire harness of the present disclosure, an effect of being able to improve assembly workability is exhibited.

BRIEF DESCRIPTION OF THE DRAWINGS

FIG. 8 is a schematic exploded cross-sectional view showing a wire harness according to a modified example.

DETAILED DESCRIPTION OF EMBODIMENTS

Description of Embodiments of Present Disclosure

Figure 1:
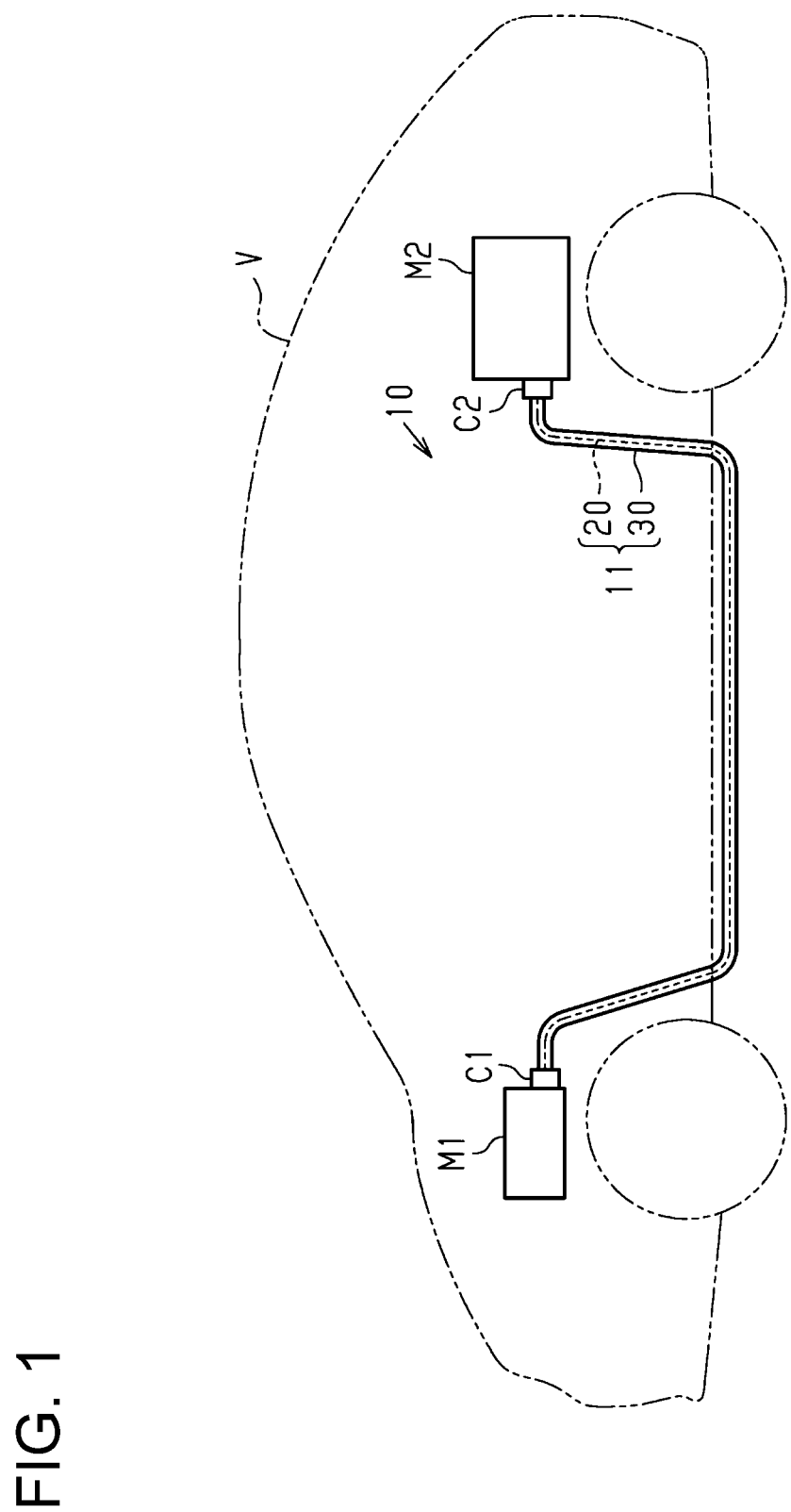
FIG. 1 is a schematic configuration diagram showing a wire harness according to an embodiment.

First, embodiments of the present disclosure will be listed and described.

[1] The wire harness of the present disclosure includes: a wire harness main body including an electric wire member and an outer cover member enclosing an outer circumference of the electric wire member; a route-regulating member that is attached to an outer circumference of the outer cover member and regulates a route of the wire harness main body; and an attachment member attached to an outer circumference of a portion in a lengthwise direction of the route-regulating member, in which the route-regulating member includes a first main body portion that covers a portion of the outer circumference of the outer cover member, and an insertion port that is open in a direction orthogonal to a lengthwise direction of the first main body portion and extends along the entire length in the lengthwise direction of the first main body portion, the route-regulating member includes a connecting portion that is connected to the attachment member, the attachment member includes a covering portion that covers an outer circumference of the connecting portion, and the covering portion includes a regulating wall that is engageable with an end surface in the lengthwise direction of the route-regulating member in a lengthwise direction of the wire harness main body.

According to this configuration, the connecting portion of the route-regulating member and the covering portion of the attachment member are provided so as to overlap each other in the lengthwise direction of the wire harness main body. At this time, the covering portion is provided with the regulating wall that is engageable with the end surface in the lengthwise direction of the route-regulating member. Thus, by engaging the end surface in the lengthwise direction of the route-regulating member with the regulating wall, the route-regulating member can be easily positioned with respect to the attachment member when attaching the route-regulating member to the attachment member. As a result, it is possible to improve workability when attaching the route-regulating member to the attachment member. Accordingly, it is possible to make the wire harness easier to assemble.

[2] It is preferable that the covering portion is formed in a ring shape enclosing all the way around the outer circumference of the connecting portion and the outer circumference of the outer cover member at a portion to which the connecting portion is attached, and the covering portion includes a second main body portion that covers a portion of the outer circumference of the first main body portion and a lid portion that is coupled to the second main body portion.

According to this configuration, although the covering portion is ring-shaped, the covering portion is divided into the second main body portion and the lid portion, whereby the attachment member including the covering portion can be retrofitted to the route-regulating member and the outer cover member. It is possible to make the wire harness easier to assemble.

[3] It is preferable that the regulating wall includes a main-body-side regulating wall that protrudes from an inner surface of the second main body portion inward in a radial direction of the covering portion, and a lid-side regulating wall that protrudes from an inner surface of the lid portion inward in the radial direction of the covering portion.

According to this configuration, if the route-regulating member is first inserted into the second main body portion, the end surface in the lengthwise direction of the route-regulating member can be engaged with the main-body-side regulating wall. Also, if the route-regulating member is first inserted into the lid portion, the end surface in the lengthwise direction of the route-regulating member can be engaged with the lid-side regulating wall. As a result, regardless of whether the route-regulating member is first inserted into either the second main body portion or the lid portion, the route-regulating member can be easily positioned with respect to the attachment member.

[4] It is preferable that the second main body portion has a first accommodation port that is open in a direction orthogonal to a lengthwise direction of the second main body portion, and the main-body-side regulating wall is formed over the entire circumference of the second main body portion, in a circumferential direction of the covering portion, the main-body-side regulating wall has a second accommodation port that is open in a direction orthogonal to the lengthwise direction of the second main body portion and is in communication with the first accommodation port, an opening width of the second accommodation port is smaller than an opening width of the first accommodation port, and the opening width of the second accommodation port is smaller than an outer diameter of the route-regulating member.

According to this configuration, the opening width of the second accommodation port provided in the main-body-side regulating wall is smaller than the outer diameter of the route-regulating member. Thus, when the route-regulating member is inserted into the covering portion, the end surface in the lengthwise direction of the route-regulating member can be suitably engaged with the main-body-side regulating wall. As a result, the route-regulating member can be suitably positioned with respect to the attachment member.

[5] It is preferable that the route-regulating member includes a first end portion and a second end portion that are two end portions in a circumferential direction of the first main body portion and form the insertion port, the covering portion has a projecting portion that protrudes from an inner surface of the covering portion to the insertion port, and the projecting portion is able to come into contact with at least one of the first end portion and the second end portion in a circumferential direction of the route-regulating member.

According to this configuration, the projecting portion of the covering portion can come into contact with at least one of the first end portion and the second end portion forming the insertion port in the circumferential direction of the route-regulating member. For this reason, the projecting portion and the first end portion or the second end portion are engaged with each other in the circumferential direction of the route-regulating member. As a result, it is possible to suitably suppress rotation of the route-regulating member in the circumferential direction with respect to the covering portion.

[6] It is preferable that the outer cover member is a corrugated tube having an accordion structure in which a ring-shaped protrusion and a ring-shaped recess are alternatingly continuous with each other in a lengthwise direction of the outer cover member, and the projecting portion has a protrusion that enters the ring-shaped recess.

According to this configuration, the projecting portion has a protrusion that enters the ring-shaped recess of the corrugated tube. For this reason, it is possible to suppress movement of the corrugated tube with respect to the attachment member in the lengthwise direction of the corrugated tube.

[7] It is preferable that a fastening allowance is provided between an outer circumference of the route-regulating member and an inner circumference of the covering portion.

According to this configuration, the route-regulating member is fitted to the inner circumference of the covering portion with the fastening allowance interposed therebetween. That is, when the route-regulating member is fitted into the covering portion, the outer circumferential surface of the route-regulating member and the inner circumferential surface of the covering portion are brought into contact with each other in a state in which the fastening allowance is present therebetween. As a result, the route-regulating member fitted into the covering portion is held in a state of being constantly pressed inward in the radial direction of the covering portion by the inner surface of the covering portion. Therefore, rattling of the route-regulating member in the covering portion can be suppressed. Also, relative movement of the route-regulating member with respect to the covering portion is suitably suppressed in the lengthwise direction of the wire harness main body. For this reason, it is possible to suitably suppress positional misalignment of the route-regulating member with respect to the covering portion in the lengthwise direction of the wire harness main body, and to suitably suppress detachment of the route-regulating member from the covering portion.

[8] It is preferable that, when the route-regulating member is a first route-regulating member, the attachment member is a second route-regulating member that is attached to the outer circumference of the outer cover member and has a route-regulating portion that regulates the route of the wire harness main body, the connecting portion is provided at an end portion in the lengthwise direction of the first route-regulating member, the second route-regulating member is formed such that the covering portion and the route-regulating portion are continuous with each other in the lengthwise direction of the wire harness main body, the covering portion is provided at an end portion in a lengthwise direction of the second route-regulating member, and the regulating wall is provided at an end portion that is connected to the route-regulating portion, out of the two end portions in a lengthwise direction of the covering portion.

According to this configuration, the regulating wall is provided at the end portion that is connected to the route-regulating portion, out of the two end portions in the lengthwise direction of the covering portion. This regulating wall regulates the amount by which the first route-regulating member is inserted into the second route-regulating member in the lengthwise direction of the wire harness main body. Thus, it is possible to inhibit the first route-regulating member from being inserted to the route-regulating portion of the second route-regulating member in the lengthwise direction of the wire harness main body.

[9] It is preferable that the first route-regulating member regulates the route of a straight section, which is a section having a linear shape in the route of the wire harness main body, and the second route-regulating member regulates the route of a bent section, which is a section that is bent in the route of the wire harness main body.

According to this configuration, the route of the straight section is regulated by the first route-regulating member, and the route of the bent section is regulated by the second route-regulating member. As a result, it is possible to prevent the route of the straight section and the route of the bent section from deviating from the desired routes.

Details of Embodiments of the Present Disclosure

Specific examples of the wire harness of the present disclosure will be described below with reference to the drawings. In each drawing, for convenience of description, portions of the configuration may be exaggerated or simplified. Also, the dimensional proportions of each portion may differ between drawings. In the present specification, "orthogonal", "parallel", and "entire length" include not only the case of being strictly orthogonal, parallel, and the entire length, but also the case of being approximately orthogonal, parallel, and the entire length within a range in which the actions and effects in the present embodiment are exhibited. In the present specification, "equal" includes not only the case of being exactly equal but also the case where there are some differences between comparison targets due to the influence of dimensional tolerances and the like. Also, the term "tubular shape" used in the description of the present specification is not limited to a circumferential wall that is formed continuously all the way around, but also a tubular shape formed by combining a plurality of components, and a tubular shape having a notch or the like in a portion in the circumferential direction thereof, as with a C shape. Note that a "tubular" shape includes, but is not limited to, a circular shape, an elliptical shape, and a polygon having sharp or rounded corners. Also, the term "ring shape" used in the description of the present specification may refer to any structure that forms a loop, or a continuous shape with no end portions, as well as a generally loop-shaped structure having a gap, such as a C shape. Note that a "ring-shaped" shape includes, but is not limited to, a circular shape, an elliptical shape, and a polygon having sharp or rounded corners. Also, "opposing" in the present specification means that faces or members are at positions in front of each other, and includes not only a case where they are completely in front of each other but also a case of being at positions where they are partially in front of each other. Also, the term "opposing" in the present specification includes both the case where a member different from two portions is interposed between the two portions and the case where nothing is interposed between the two portions. Note that the present disclosure is not limited to these examples, and is indicated by the claims, and is intended to include all modifications within the meaning and scope equivalent to the claims.

Overall Configuration of Wire Harness 10

A wire harness 10 shown in FIG. 1 is to be mounted in a vehicle V such as a hybrid vehicle or an electric vehicle, for example. The wire harness 10 electrically connects two or more on-board devices to each other. The on-board devices are electric devices mounted in the vehicle V. The wire harness 10 electrically connects, for example, an inverter M1 that is installed in a front portion of the vehicle V and a high-voltage battery M2 that is installed rearward of the inverter M1 in the vehicle V, to each other. The wire harness 10 has an elongated shape that extends in a front-rear direction of the vehicle V, for example. The wire harness 10 is routed in the vehicle V so that, for example, an intermediate portion in the lengthwise direction of the wire harness 10 passes outside the vehicle interior such as under the floor of the vehicle V.

The inverter M1 is, for example, connected to a motor (not shown) for driving wheels, which serves as a power source when the vehicle travels. The inverter M1 generates AC power from the DC power of the high-voltage battery M2, and supplies the AC power to the motor. The high-voltage battery M2 is, for example, a battery that is capable of supplying a voltage of several hundred volts.

The wire harness 10 includes a wire harness main body 11. The wire harness main body 11 includes an electric wire member 20 (electric wire) and a tubular outer cover member 30 (outer cover) that encloses the outer circumference of the electric wire member 20. The wire harness 10 has connectors C1 and C2 that are respectively attached to two end portions of the electric wire member 20. One end portion in the lengthwise direction of the electric wire member 20 is connected to the inverter M1 via the connector C1, and the other end portion in the lengthwise direction of the electric wire member 20 is connected to the high-voltage battery M2 via the connector C2.

Figure 2:
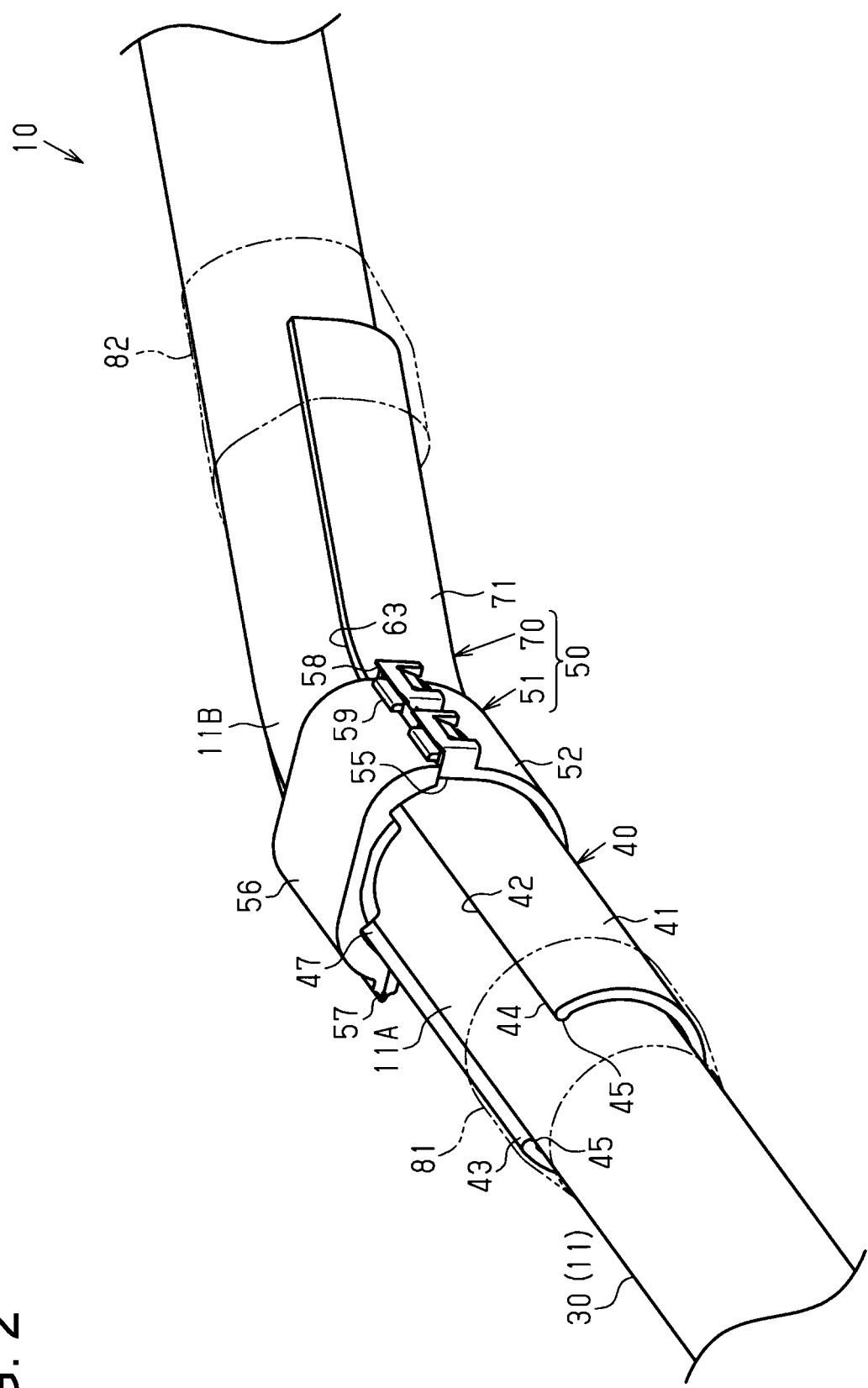
FIG. 2 is a schematic perspective view showing a wire harness according to an embodiment.
Figure 3:
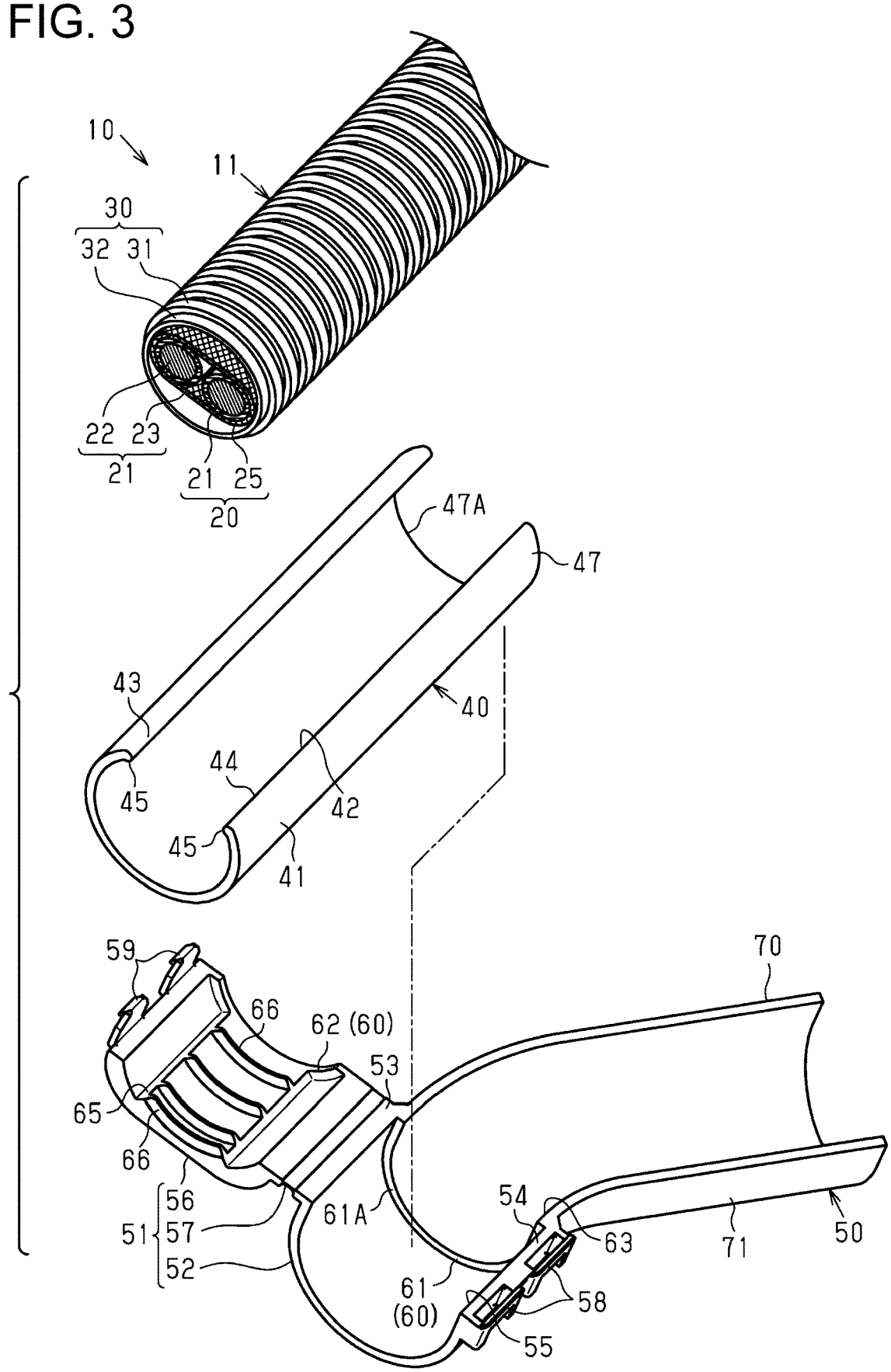
FIG. 3 is a schematic exploded perspective view showing a wire harness according to an embodiment.

As shown in FIGS. 2 and 3, the wire harness 10 includes a first route-regulating member 40 (first route-regulating cover) that is attached to the outer circumference of the outer cover member 30 and a second route-regulating member 50 (second route-regulating cover) that is attached to the outer circumference of the outer cover member 30. The first route-regulating member 40 and the second route-regulating member 50 regulate the route along which the wire harness main body 11 is routed. Note that the first route-regulating member 40 and the second route-regulating member 50 are omitted from FIG. 1.

Configuration of Electric Wire Member 20

Figure 4:
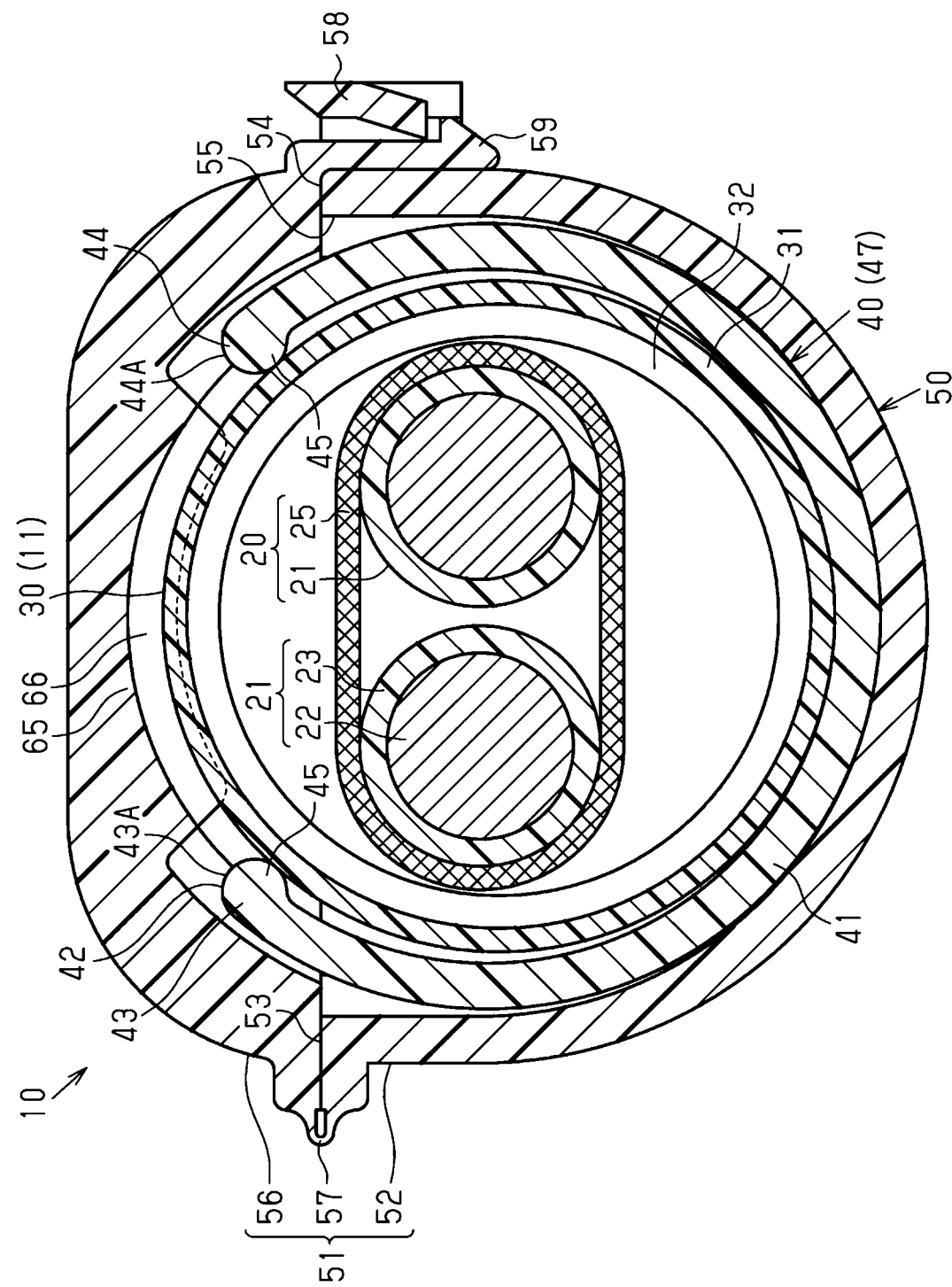
FIG. 4 is a schematic transverse cross-sectional view showing a wire harness according to an embodiment.

As shown in FIGS. 3 and 4, for example, the electric wire member 20 includes one or more electric wires 21 (two in the present embodiment) and a braided member 25 that collectively encloses the outer circumferences of the plurality of electric wires 21.

As shown in FIG. 4, each electric wire 21 is a coated electric wire that includes a conductive core wire 22 and an insulating coating 23 that encloses the outer circumference of the core wire 22 and has insulating properties. Each electric wire 21 is, for example, a high-voltage electric wire that supports a high voltage and a large current. Each electric wire 21 may be, for example, a non-shielded electric wire that does not include an electromagnetic shield structure, or a shielded electric wire that includes an electromagnetic shield structure. Each electric wire 21 in the present embodiment is a non-shielded electric wire.

As the core wire 22, a stranded wire that is constituted by a plurality of metal strands twisted together, a single core wire that is constituted by a single conductor, or the like may be used, for example. As the single core wire, a columnar conductor that is constituted by one columnar metal rod with a solid internal structure, a tubular conductor with a hollow internal structure, or the like may be used, for example. As the core wire 22, a combination of a stranded wire, a columnar conductor, or a tubular conductor may be used. As the material of the core wire 22, a metal material such as a copper-based material or an aluminium-based material may be used, for example.

The insulating coating 23 covers, for example, all the way around the outer circumferential surface of the core wire 22. The insulating coating 23 is constituted by, for example, a resin material that has insulating properties.

The cross-sectional shape of each wire 21 cut along a plane that is orthogonal to the lengthwise direction of each wire 21, that is, the transverse cross-sectional shape of each wire 21, may be any shape. The transverse cross-sectional shape of each electric wire 21 may be, for example, a circular shape, a semi-circular shape, a polygonal shape, a square shape, a flat shape, or the like. The transverse cross-sectional shape of each electric wire 21 in the present embodiment is a circular shape.

The braided member 25 has, for example, an overall tubular shape that collectively encloses the outer circumferences of the plurality of electric wires 21. As the braided member 25, a braided wire in which a plurality of metal strands are braided or a braided wire in which metal strands and resin strands are braided in combination with each other may be used, for example. As the material of the metal strands, a metal material such as a copper-based material or an aluminium-based material may be used, for example. Although not shown in the drawings, the two end portions of the braided member 25 in the lengthwise direction are grounded at, for example, the connectors C1 and C2 (see FIG. 1).

Configuration of Outer Cover Member 30

As shown in FIG. 3, the outer cover member 30 has a tubular shape that encloses all the way around the outer circumference of the electric wire member 20. The outer cover member 30 in the present embodiment is formed in a cylindrical shape. The outer cover member 30 is, for example, provided with a circumferential wall that is formed so as to be continuous all the way around the circumferential surface of the outer cover member 30. The outer cover member 30 is, for example, sealed all the way around the circumferential surface of the outer cover member 30. The outer cover member 30 has, for example, a function of protecting the electric wire member 20 from flying objects and water droplets.

The outer cover member 30 is, for example, flexible and is easily bendable. Examples of the flexible outer cover member 30 include a resin corrugated tube and a rubber waterproof cover. The outer cover member 30 of the present embodiment is a resin corrugated tube having an accordion structure in which ring-shaped protrusions 31 and ring-shaped recesses 32 are provided alternatingly and continuously along the lengthwise direction of the outer cover member 30. Each of the ring-shaped protrusions 31 and the ring-shaped recesses 32 has, for example, a ring shape that encircles the outer cover member 30 once in the circumferential direction. As the material of the outer cover member 30, for example, a synthetic resin such as polyolefin, polyamide, polyester, or ABS resin can be used. Note that in FIGS. 1 and 2, the outer cover member 30 is shown simplified for the sake of simplification of the drawings.

Configuration of First Route-Regulating Member 40 and Second Route-Regulating Member 50

As shown in FIG. 2, each of the first route-regulating member 40 and the second route-regulating member 50 holds the outer cover member 30. Each of the first route-regulating member 40 and the second route-regulating member 50 is harder than, for example, the outer cover member 30. Each of the first route-regulating member 40 and the second route-regulating member 50 has a hardness that makes it more difficult to bend in a direction orthogonal to the lengthwise direction of the wire harness main body 11 compared to the outer cover member 30. As a result, the first route-regulating member 40 and the second route-regulating member 50 regulate the route of the wire harness main body 11. For example, the first route-regulating member 40 and the second route-regulating member 50 assist the outer cover member 30 so that the wire harness main body 11 does not deviate from the desired route as a result of bending under its own weight or the like. The outer cover member 30 is less likely to bend than, for example, in a state where the first route-regulating member 40 and the second route-regulating member 50 are not attached.

The first route-regulating member 40 is provided along a portion in the lengthwise direction of the wire harness main body 11. For example, the first route-regulating member 40 is attached to the outer circumference of the outer cover member 30 along a straight section 11A, which is a straight section of the route of the wire harness main body 11. The first route-regulating member 40 regulates the route of the wire harness main body 11 in the straight section 11A. Here, the straight section 11A is a section in which the route of the wire harness main body 11 extends linearly in one direction. Note that one or more first route-regulating members 40 are provided depending on the route of the wire harness main body 11.

The second route-regulating member 50 is provided along a portion in the lengthwise direction of the wire harness main body 11. For example, the second route-regulating member 50 is attached to the outer circumference of the outer cover member 30 along a bent section 11B, which is a bent section of the route of the wire harness main body 11. The second route-regulating member 50 regulates the route of the wire harness main body 11 in the bent section 11B. Here, the bent section 11B is a section in which the route of the wire harness main body 11 is bent two-dimensionally or three-dimensionally. Note that one or more second route-regulating members 50 may be provided depending on the route of the wire harness main body 11.

Configuration of First Route-Regulating Member 40

As shown in FIG. 4, the first route-regulating member 40 covers part of the outer circumference of the outer cover member 30 in the circumferential direction of the outer cover member 30. The first route-regulating member 40 has a tubular shape that covers the outer circumference of the outer cover member 30 in a portion in the circumferential direction of the outer cover member 30. The transverse cross-sectional shape of the first route-regulating member 40 is C-shaped overall. The first route-regulating member 40 covers, for example, a range larger than half of the outer circumference of the outer cover member 30. The transverse cross-sectional shape of the first route-regulating member 40 is, for example, uniform over the entire length in the lengthwise direction of the first route-regulating member 40. As shown in FIG. 2, the first route-regulating member 40 extends along the route of the straight section 11A, and is formed in a shape extending linearly in one direction, for example.

The first route-regulating member 40 is made of metal or resin, for example. The first route-regulating member 40 in the present embodiment is made of resin. As the material of the first route-regulating member 40, a synthetic resin such as polypropylene, polyamide, or polyacetal may be used, for example. The first route-regulating member 40 may be manufactured using a well-known manufacturing method such as extrusion molding or injection molding, for example.

As shown in FIG. 3, the first route-regulating member 40 has a first main body portion 41 (first main body) that covers part of the outer circumference of the outer cover member 30, and an insertion port 42 that is open in a direction orthogonal to the lengthwise direction of the first main body portion 41. The first route-regulating member 40 has a first end portion 43 and a second end portion 44 which are both ends in the circumferential direction of the first main body portion 41 and form the insertion port 42.

As shown in FIG. 4, the first main body portion 41 forms the main part of the first route-regulating member 40. The thickness in the radial direction of the first main body portion 41 is, for example, uniform in the circumferential direction of the first route-regulating member 40. The transverse cross-sectional shape of the first main body portion 41 is formed, for example, in a shape that extends along the outer surface of the outer cover member 30. The transverse cross-sectional shape of the first main body portion 41 is formed, for example, in an arc shape.

The first end portion 43 and the second end portion 44 are provided on mutually opposite sides in the circumferential direction of the first main body portion 41. The first end portion 43 and the second end portion 44 are provided spaced apart from each other with the insertion port 42 interposed therebetween in the circumferential direction of the first main body portion 41. In other words, the gap between the first end portion 43 and the second end portion 44 in the circumferential direction of the first route-regulating member 40 forms the insertion port 42. As described above, the first route-regulating member 40 is formed in a C shape having the insertion port 42 in a portion in the circumferential direction of the first main body portion 41.

The opening width of the insertion port 42, that is, the shortest distance between the first end portion 43 and the second end portion 44 is smaller than, for example, the outer diameter of the outer cover member 30. As shown in FIG. 3, the insertion port 42 extends along the lengthwise direction of the first main body portion 41 over the entire length in the lengthwise direction of the first main body portion 41. That is, the insertion port 42 is formed so as to be open in a direction orthogonal to the lengthwise direction of the first main body portion 41 and to be open at both ends in the lengthwise direction of the first main body portion 41.

In response to the outer cover member 30 being inserted into the insertion port 42 from a direction orthogonal to the lengthwise direction of the first route-regulating member 40, the first route-regulating member 40 is elastically deformed and the opening width of the insertion port 42 increases. Once the outer cover member 30 has been inserted into the first route-regulating member 40, the first route-regulating member 40 elastically returns to return to its original shape. As a result, the opening width of the insertion port 42 becomes smaller than the outer diameter of the outer cover member 30, and therefore the first route-regulating member 40 is attached to the outer circumference of the outer cover member 30.

Note that, in a state in which the outer cover member 30 is inserted into the first route-regulating member 40, the opening width of the insertion port 42 does not always return to its original width, that is, the width thereof when the outer cover member 30 is not inserted. Specifically, there are cases where elastic deformation of the first main body portion 41 to return to its original shape is inhibited by the outer cover member 30, and thus the opening width of the insertion port 42 is slightly larger than its original width. There are also cases where, when the outer cover member 30 is bent due to being pressed by the first route-regulating member 40 in a state in which the outer cover member 30 is inserted into the first route-regulating member 40, the opening width of the insertion port 42 returns to its original width. That is, the opening width of the insertion port 42 in a state in which the outer cover member 30 is inserted into the first route-regulating member 40 is a distance that is based on the rigidity, flexibility, and the like of the outer cover member 30 and the first route-regulating member 40.

As shown in FIG. 4, the first end portion 43 has a leading end 43A. The second end portion 44 has a leading end 44A. The leading ends 43A and 44A form the insertion port 42. The leading ends 43A and 44A are formed in a curved shape when viewed from the lengthwise direction of the first route-regulating member 40. That is, the transverse cross-sectional shapes of the leading ends 43A and 44A are formed in curved shapes.

The first route-regulating member 40 has, for example, protruding portions 45 that protrude from the inner surfaces of the first end portion 43 and the second end portion 44. Each protruding portion 45 protrudes toward the outer cover member 30 inserted into the first route-regulating member 40 and can come into contact with the outer surface of the outer cover member 30. The protruding portions 45 come into contact with, for example, the outer surfaces of the ring-shaped protrusions 31 of the outer cover member 30. The two protruding portions 45 protrude from the inner surfaces of the leading ends 43A and 44A, for example. The transverse cross-sectional shape of each protruding portion 45 is formed, for example, into a curved shape. The transverse cross-sectional shape of each protruding portion 45 of the present embodiment is formed in a semi-circular shape. Each protruding portion 45 extends, for example, along the lengthwise direction of the first route-regulating member 40 over the entire length in the lengthwise direction of the first route-regulating member 40.

Each protruding portion 45 presses the outer cover member 30 from the outer side of the outer cover member 30, for example. The outer cover member 30 is elastically sandwiched by the two protruding portions 45 and the first main body portion 41. As a result, the connection of the first route-regulating member 40 to the outer cover member 30 is strengthened. Accordingly, the first route-regulating member 40 attached to the outer circumference of the outer cover member 30 is suppressed from moving in the lengthwise direction of the outer cover member 30.

As shown in FIG. 3, the first route-regulating member 40 has a connecting portion 47 (connection) that is to be connected to the second route-regulating member 50. The connecting portion 47 is provided, for example, at one end portion in the lengthwise direction of the first route-regulating member 40. The connecting portion 47 has an end surface 47A in the lengthwise direction of the first route-regulating member 40.

Configuration of Second Route-Regulating Member 50

As shown in FIG. 2, the second route-regulating member 50 is attached to the outer circumference of the outer cover member 30 in the bent section 11B. The second route-regulating member 50 is bent along the shape of the bent section 11B. The second route-regulating member 50 is made of, for example, metal or resin. The second route-regulating member 50 of the present embodiment is made of resin. As the material of the second route-regulating member 50, for example, a synthetic resin such as polypropylene, polyamide, or polyacetal can be used. The second route-regulating member 50 can be manufactured using a known manufacturing method such as injection molding.

The second route-regulating member 50 has a covering portion 51 (cover) that covers a portion in the lengthwise direction of the first route-regulating member 40, and a route-regulating portion 70 that is attached to the outer circumference of the outer cover member 30. In the second route-regulating member 50, the covering portion 51 and the route-regulating portion 70 are continuous with each other in the lengthwise direction of the wire harness main body 11, for example. The second route-regulating member 50 is, for example, a single component in which the covering portion 51 and the route-regulating portion 70 are formed in one piece. The covering portion 51 is provided, for example, at one end portion in the lengthwise direction of the second route-regulating member 50. The covering portion 51 has a second main body portion 52 (second main body) and a lid portion 56 (lid) that is coupled to the second main body portion 52. The route-regulating portion 70 has a third main body portion 71. The third main body portion 71 is formed in one piece continuous with the second main body portion 52.

Configuration of Covering Portion 51

As shown in FIG. 2, the covering portion 51 is provided, for example, so as to overlap the connecting portion 47 in the radial direction of the outer cover member 30. That is, in the wire harness 10, one end portion in the lengthwise direction of the first route-regulating member 40 and one end portion in the lengthwise direction of the second route-regulating member 50 are provided so as to overlap each other in the lengthwise direction of the wire harness main body 11.

The covering portion 51 encloses, for example, the outer circumference of the connecting portion 47 of the first route-regulating member 40. The covering portion 51 is formed, for example, in a ring shape that encloses all the way around the connecting portion 47 and the outer cover member 30 at the portion to which the connecting portion 47 is attached to the outer cover member 30. The covering portion 51 extends, for example, along the route of the straight section 11A, and is formed in a shape extending linearly in one direction.

As shown in FIG. 4, the second main body portion 52 covers, for example, a portion of the outer circumference of the outer cover member 30 in the circumferential direction of the outer cover member 30. The second main body portion 52 covers, for example, a portion of the outer circumference of the first route-regulating member 40 in the circumferential direction of the first route-regulating member 40. The second main body portion 52 has a tubular shape that covers the outer circumference of the first route-regulating member 40 at a portion in the circumferential direction of the first route-regulating member 40. The second main body portion 52 covers, for example, the outer circumference of the first main body portion 41 of the first route-regulating member 40. The second main body portion 52 covers, for example, a range larger than half of the outer circumference of the first main body portion 41. The transverse cross-sectional shape of the inner surface of the second main body portion 52 is formed, for example, in a shape corresponding to the outer surface of the first main body portion 41. The transverse cross-sectional shape of the inner surface of the second main body portion 52 is formed, for example, into a curved shape. The transverse cross-sectional shape of the inner surface of the second main body portion 52 is U-shaped overall.

The second main body portion 52 has a third end portion 53 and a fourth end portion 54, which are the two ends in the circumferential direction of the second main body portion 52. The second main body portion 52 has a first accommodation port 55 that is formed by the third end portion 53 and the fourth end portion 54. The first accommodation port 55 is an opening between the third end portion 53 and the fourth end portion 54. As shown in FIG. 3, the first accommodation port 55 is open in a direction orthogonal to the lengthwise direction of the second main body portion 52. The first accommodation port 55 extends along the lengthwise direction of the second main body portion 52, over the entire length in the lengthwise direction of the second main body portion 52. The opening width of the first accommodation port 55, that is, the shortest distance between the third end portion 53 and the fourth end portion 54 is, for example, equal to the outer diameter of the first route-regulating member 40, or is greater than the outer diameter of the first route-regulating member 40. The outer cover member 30 and the first route-regulating member 40 are inserted into the first accommodation port 55 along a direction orthogonal to the lengthwise direction of the second route-regulating member 50.

The lid portion 56 is formed in one piece with, for example, the second main body portion 52. The transverse cross-sectional shape of the inner surface of the lid portion 56 is formed, for example, in a shape corresponding to the outer surface of the outer cover member 30. The transverse cross-sectional shape of the inner surface of the lid portion 56 is formed, for example, in a shape corresponding to the outer surface of the first route-regulating member 40. The transverse cross-sectional shape of the inner surface of the lid portion 56 is formed, for example, in an elliptical arc shape or an ovoid arc shape. The lid portion 56 is formed, for example, in the shape of a substantially semi-elliptical cylinder. Here, "oval" in the present specification is a shape consisting of two parallel lines having substantially equal lengths and two semi-circles.

The lid portion 56 covers the first accommodation port 55 of the second main body portion 52. The lid portion 56 covers the first accommodation port 55, for example, only in the covering portion 51 in the lengthwise direction of the second route-regulating member 50. In other words, the lid portion 56 is only provided in the covering portion 51 of the second route-regulating member 50, and is not provided on the route-regulating portion 70.

The covering portion 51 has, for example, a hinge portion 57 that connects the second main body portion 52 and the lid portion 56. The hinge portion 57 connects one end in the circumferential direction (here, the third end portion 53) of the second main body portion 52 and one end in the circumferential direction of the lid portion 56. One or more (in this embodiment, two) lock portions 58 are provided at the other end in the circumferential direction (here, the fourth end portion 54) of the second main body portion 52. One or more (in this embodiment, two) claw portions 59 are provided at the other end in the circumferential direction of the lid portion 56.

The second main body portion 52 and the lid portion 56 are relatively rotatable about the hinge portion 57. The lid portion 56 is rotatable between an open position shown in FIG. 3 and a closed position shown in FIG. 2, using the hinge portion 57 as an axis. As shown in FIG. 4, the claw portions 59 latch onto the lock portions 58 when the lid portion 56 is in the closed position. As a result, the lid portion 56 is held in the closed position. In this manner, the second main body portion 52 and the lid portion 56 are coupled to each other. In a state where the second main body portion 52 and the lid portion 56 are coupled to each other, the covering portion 51 forms a ring shape that collectively encloses the outer circumferences of the outer cover member 30 and the connecting portion 47. The lid portion 56 covers the first accommodation port 55 of the second main body portion 52 in the closed position. The lid portion 56 covers the insertion port 42 at the connecting portion 47, for example, in the closed position.

In this embodiment, the inner surface of the lid portion 56 does not come in contact with the outer surface of the first route-regulating member 40 while the lid portion 56 is located at a closed position. That is, a gap is formed between the inner surface of the lid portion 56 and the outer surface of the first route-regulating member 40. This gap is formed over the entire length of the covering portion 51 in the lengthwise direction thereof, for example.

As shown in FIG. 3, the covering portion 51 has, for example, a regulating wall 60 that can engage with the end surface 47A in the lengthwise direction of the first route-regulating member 40 in the lengthwise direction of the wire harness main body 11. The regulating wall 60 protrudes, for example, inward in the radial direction of the covering portion 51 from the inner surface of the covering portion 51. The regulating wall 60 extends, for example, along the circumferential direction of the covering portion 51. The regulating wall 60 extends, for example, all the way around the circumferential surface of the covering portion 51. The regulating wall 60 is provided at one end in the lengthwise direction of the covering portion 51.

The regulating wall 60 has, for example, a main-body-side regulating wall 61 formed on the inner surface of the second main body portion 52, and a lid-side regulating wall 62 formed on the inner surface of the lid portion 56. The main-body-side regulating wall 61 and the lid-side regulating wall 62 are provided, for example, at the same position as each other in the lengthwise direction of the wire harness main body 11.

Figure 5:
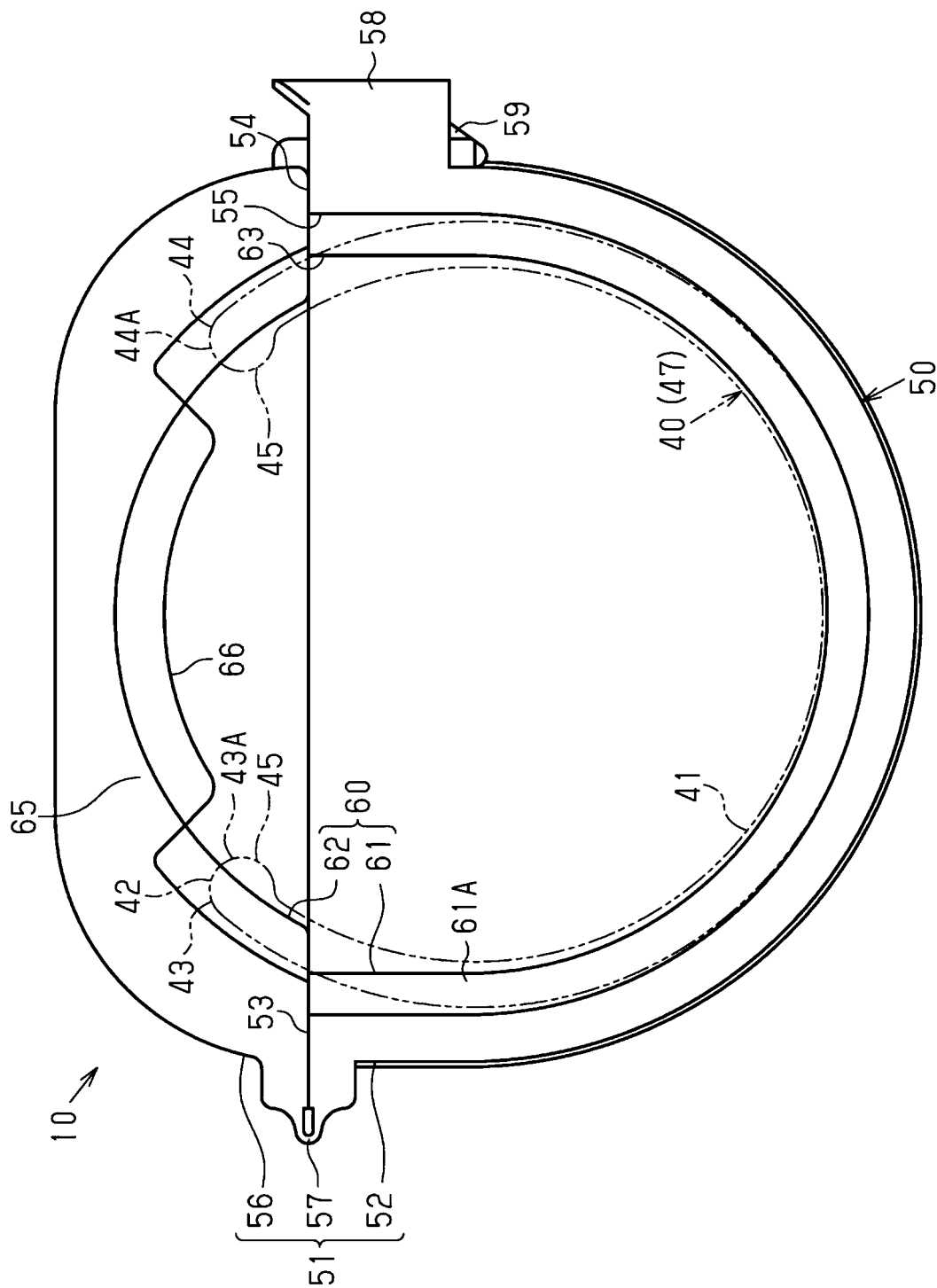
FIG. 5 is a schematic front view showing a wire harness according to an embodiment.

As shown in FIG. 5, the main-body-side regulating wall 61 protrudes inward in the radial direction from the inner surface of the second main body portion 52. The main-body-side regulating wall 61 extends over the entire circumference of the second main body portion 52, for example, in the circumferential direction of the covering portion 51. The transverse cross-sectional shape of the inner surface of the main-body-side regulating wall 61 is formed in the same shape as the transverse cross-sectional shape of the inner surface of the second main body portion 52. The transverse cross-sectional shape of the inner surface of the main-body-side regulating wall 61 of the present embodiment is formed in a U shape. The transverse cross-sectional shape of the inner surface of the main-body-side regulating wall 61 is formed to be one size smaller than the transverse cross-sectional shape of the inner surface of the second main body portion 52, for example. Note that the electric wire member 20 is not shown in FIG. 5.

The main-body-side regulating wall 61 has a second accommodation port 63 that is open in a direction orthogonal to the lengthwise direction of the second main body portion 52. The second accommodation port 63 is in communication with the first accommodation port 55. The first accommodation port 55 and the second accommodation port 63 extend over the entire length in the lengthwise direction of the second main body portion 52. The opening width of the second accommodation port 63 is smaller than the opening width of the first accommodation port 55. The opening width of the second accommodation port 63 is smaller than, for example, the outer diameter of the first route-regulating member 40.

As shown in FIG. 3, the main-body-side regulating wall 61 is provided, for example, at the end portion connected to the third main body portion 71 out of the two ends in the lengthwise direction of the second main body portion 52. The main-body-side regulating wall 61 extends, for example, along the lengthwise direction of the wire harness main body 11. The main-body-side regulating wall 61 extends from the end portion of the second main body portion 52, for example, over the entire length in the lengthwise direction of the third main body portion 71. For example, a level difference is formed by the main-body-side regulating wall 61 at the boundary portion between the inner surface of the second main body portion 52 and the inner surface of the third main body portion 71.

Figure 6:
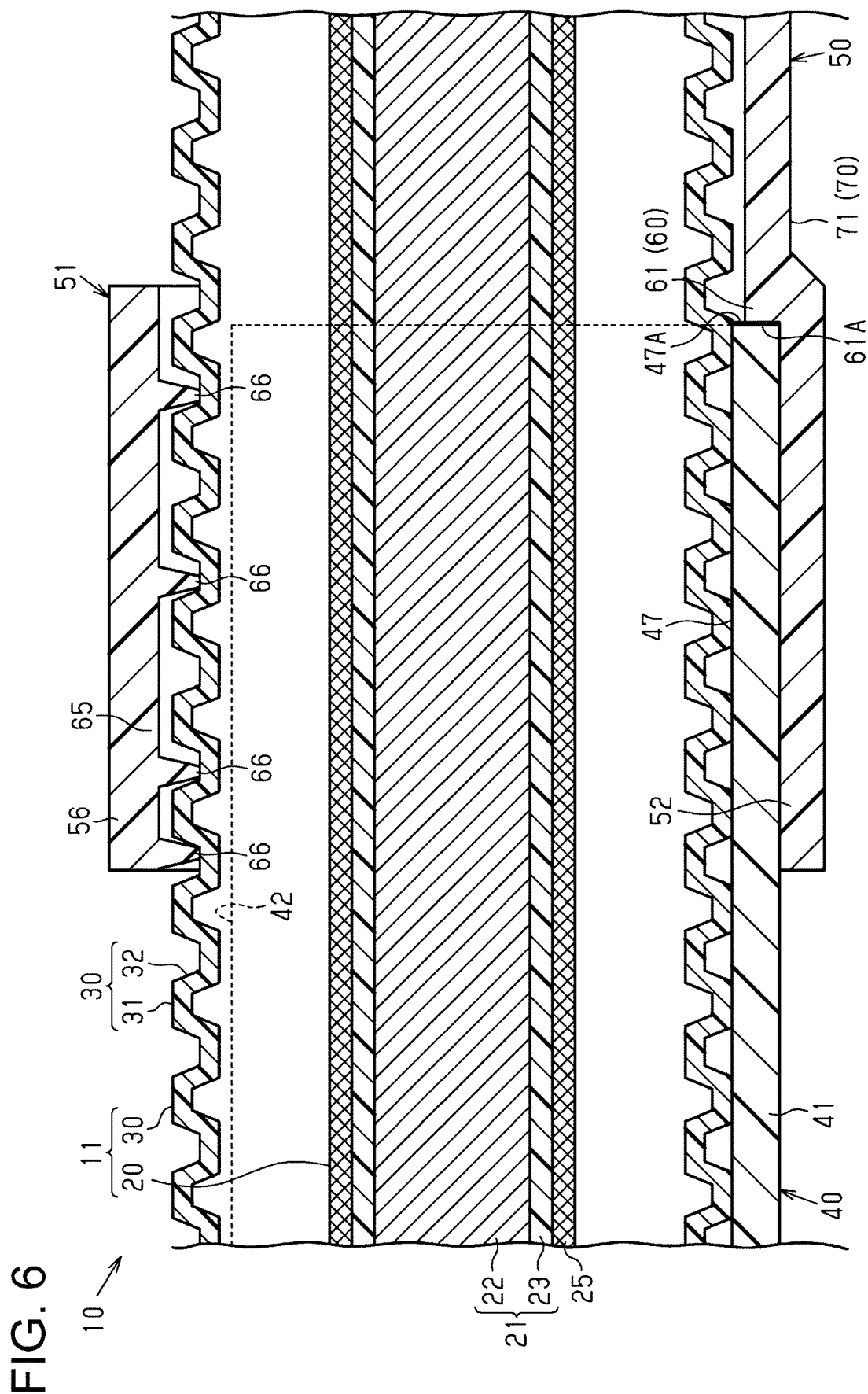
FIG. 6 is a schematic cross-sectional view showing a wire harness according to an embodiment.

As shown in FIG. 6, an end surface 61A in the lengthwise direction of the main-body-side regulating wall 61 opposes, for example, the first main body portion 41 of the first route-regulating member 40 in the lengthwise direction of the wire harness main body 11 and can come into contact with the first main body portion 41. The end surface 61A of the main-body-side regulating wall 61 opposes, for example, the end surface 47A in the lengthwise direction of the first route-regulating member 40 in the lengthwise direction of the wire harness main body 11, and can come into contact with the end surface 47A.

As shown in FIG. 5, the lid-side regulating wall 62 protrudes inward in the radial direction from the inner surface of the lid portion 56. The lid-side regulating wall 62 extends over the entire circumference of the lid portion 56, for example, in the circumferential direction of the covering portion 51. The transverse cross-sectional shape of the inner surface of the lid-side regulating wall 62 is formed, for example, in a shape corresponding to the outer surface of the first route-regulating member 40. The transverse cross-sectional shape of the inner surface of the lid-side regulating wall 62 is formed, for example, in an arc shape or an elliptical arc shape. The transverse cross-sectional shape of the inner surface of the lid-side regulating wall 62 of the present embodiment is formed in a semi-elliptical arc shape.

The lid-side regulating wall 62 opposes, for example, the first end portion 43 and the second end portion 44 of the first route-regulating member 40 in the lengthwise direction of the wire harness main body 11 (see FIG. 3), and can come into contact with the first end portion 43 and the second end portion 44.

As shown in FIG. 3, the regulating wall 60 composed of the main-body-side regulating wall 61 and the lid-side regulating wall 62 comes into contact with the end surface 47A in the lengthwise direction of the first route-regulating member 40, whereby movement of the first route-regulating member 40 in the lengthwise direction of the wire harness main body 11 is regulated. For example, the regulating wall 60 regulates the movement of the first route-regulating member 40 so that the first route-regulating member 40 is not inserted into the route-regulating portion 70.

As shown in FIG. 4, the covering portion 51 has, for example, a projecting portion 65 (projection). The projecting portion 65 protrudes from the inner surface of the covering portion 51 toward the insertion port 42 of the first route-regulating member 40 inserted into the covering portion 51. The projecting portion 65 protrudes so as to be located inside the insertion port 42. The projecting portion 65 can come into contact with the first end portion 43 and the second end portion 44 in the circumferential direction of the first route-regulating member 40.

The projecting portion 65 is provided on the inner surface of the lid portion 56, for example. The projecting portion 65 protrudes from the inner surface of the lid portion 56 toward the first accommodation port 55, for example. For this reason, in a state where the projecting portion 65 is located inside the insertion port 42, the insertion port 42 faces the lid portion 56 side of the covering portion 51.

As shown in FIG. 3, the projecting portion 65 extends, for example, along the lengthwise direction of the wire harness body 11. The projecting portion 65 extends, for example, along the lengthwise direction of the covering portion 51 over the entire length of the covering portion 51 in the lengthwise direction. The projecting portion 65 is partially provided, for example, in the circumferential direction of the lid portion 56. The projecting portion 65 is provided, for example, in an intermediate portion in the circumferential direction of the lid portion 56. A portion of the projecting portion 65 constitutes, for example, a lid-side regulating wall 62. For example, the projecting portion 65 provided at one end portion in the lengthwise direction of the covering portion 51 constitutes the lid-side regulating wall 62.

As shown in FIG. 6, the projecting portion 65 has, for example, a protrusion 66 that enters a ring-shaped recess 32 of the outer cover member 30. The protrusion 66 is provided so as to further protrude from the protruding leading end surface of the projecting portion 65. A plurality of protrusions 66 are provided in the lengthwise direction of the wire harness main body 11. In the present embodiment, four protrusions 66 are provided in the lengthwise direction of the wire harness main body 11, and each of the protrusions 66 is inserted into a different ring-shaped recess 32.

Configuration of Route-Regulating Portion 70

As shown in FIG. 2, the third main body portion 71 of the route-regulating portion 70 extends along the route of the bent section 11B, for example. That is, the third main body portion 71 has a bent shape that follows the shape of the bent section 11B. The third main body 71 covers, for example, a portion of the outer circumference of the outer cover member 30 in the circumferential direction of the outer cover member 30. The third main body portion 71 has a tubular shape that covers the outer circumference of the outer cover member 30 in a portion in the circumferential direction of the outer cover member 30. The third main body portion 71 covers, for example, a range larger than half of the outer circumference of the outer cover member 30. The transverse cross-sectional shape of the inner surface of the third main body portion 71 is formed in a shape corresponding to the outer surface of the outer cover member 30, for example. The transverse cross-sectional shape of the inner surface of the third main body 71 is formed, for example, in a curved shape. The transverse cross-sectional shape of the inner surface of the third main body portion 71 is U-shaped overall.

The third main body portion 71 has a second accommodation port 63 that is open in a direction orthogonal to the lengthwise direction of the third main body portion 71. The second accommodation port 63 extends along the lengthwise direction of the third main body portion 71 over the entire length in the lengthwise direction of the third main body portion 71. The second accommodation port 63 is in communication with the first accommodation port 55. The accommodation port constituted by the first accommodation port 55 and the second accommodation port 63 extends along the lengthwise direction of the second route-regulating member 50 over the entire length in the lengthwise direction of the second route-regulating member 50. That is, the accommodation port constituted by the first accommodation port 55 and the second accommodation port 63 is open in a direction orthogonal to the lengthwise direction of the second route-regulating member 50, and is open at both ends in the lengthwise direction of the second route-regulating member 50.

The opening width of the second accommodation port 63 is, for example, equal to the outer diameter of the outer cover member 30 or larger than the outer diameter of the outer cover member 30. The outer cover member 30 is inserted into the second accommodation port 63 along a direction orthogonal to the lengthwise direction of the second route-regulating member 50. Note that the first route-regulating member 40 is not inserted into the third main body 71.

Configuration of Fixing Members 81 and 82

The wire harness 10 has, for example, a fixing member 81 for fixing the first route-regulating member 40 to the outer circumference of the outer cover member 30. The wire harness 10 has, for example, a fixing member 82 for fixing the second route-regulating member 50 to the outer circumference of the outer cover member 30. As the fixing members 81 and 82, for example, cable ties made of resin or metal, crimp rings, adhesive tape, or the like can be used. The fixing members 81 and 82 of this embodiment are adhesive tape.

The fixing member 81 is formed so as to fix, for example, the end portion provided opposite to the connecting portion 47 out of the end portions in the lengthwise direction of the first route-regulating member 40 to the outer surface of the outer cover member 30. The fixing member 81 is wound, for example, from the outer surface of the end portion in the lengthwise direction of the first route-regulating member 40 onto the outer surface of the outer cover member 30. As a result, it is possible to suppress movement of the first route-regulating member 40 with respect to the outer cover member 30 in the lengthwise direction and the circumferential direction of the wire harness main body 11. The fixing member 82 is formed so as to fix, for example, the end portion provided opposite to the covering portion 51 out of the end portions in the lengthwise direction of the second route-regulating member 50 to the outer surface of the outer cover member 30. The fixing member 82 is wound, for example, from the outer surface of the end portion in the lengthwise direction of the second route-regulating member 50 onto the outer surface of the outer cover member 30. As a result, it is possible to suppress movement of the second route-regulating member 50 with respect to the outer cover member 30 in the lengthwise direction and the circumferential direction of the wire harness main body 11.

Next, operation of this embodiment will be described.

In the lengthwise direction of the wire harness main body 11, the connecting portion 47 of the first route-regulating member 40 and the covering portion 51 of the second route-regulating member 50 are provided so as to overlap each other. At this time, the covering portion 51 is provided with a regulating wall 60 that is engageable with the end surface 47A in the lengthwise direction of the first route-regulating member 40. Thus, by engaging the end surface 47A with the regulating wall 60, the first route-regulating member 40 can be easily positioned with respect to the second route-regulating member 50 when attaching the first route-regulating member 40 to the second route-regulating member 50.

Next, effects of this embodiment will be described.

(1) The covering portion 51 of the second route-regulating member 50 is provided with the regulating wall 60 that is engageable with the end surface 47A in the lengthwise direction of the first route-regulating member 40. According to this configuration, by engaging the end surface 47A with the regulating wall 60, the first route-regulating member 40 can be easily positioned with respect to the second route-regulating member 50 when attaching the first route-regulating member 40 to the second route-regulating member 50. As a result, it is possible to improve workability when attaching the first route-regulating member 40 to the second route-regulating member 50. Accordingly, it is possible to make the wire harness 10 easier to assemble.

(2) Also, because the end surface 47A is engaged with the regulating wall 60, relative movement of the first route-regulating member 40 with respect to the second route-regulating member 50 is suppressed in the lengthwise direction of the wire harness main body 11. Thus, it is possible to suppress positional misalignment of the first route-regulating member 40 with respect to the second route-regulating member 50 in the lengthwise direction of the wire harness main body 11. As a result, the positional accuracy of the first route-regulating member 40 with respect to the second route-regulating member 50 can be improved. Here, in this embodiment, the second route-regulating member 50 is fixed to the outer cover member 30 of the wire harness main body 11 by the fixing member 82. Thus, movement of the second route-regulating member 50 with respect to the wire harness main body 11 is suppressed in the lengthwise direction of the wire harness main body 11. Thus, the positional accuracy of the first route-regulating member 40 with respect to the wire harness main body 11 can be improved by improving the positional accuracy of the first route-regulating member 40 with respect to the second route-regulating member 50. As a result, the first route-regulating member 40 can be suitably arranged at a desired position of the wire harness main body 11, here the straight section 11A and the route of the straight section 11A can be suitably regulated by the first route-regulating member 40. In other words, it is possible to suitably suppress deviation of the installation position of the first route-regulating member 40 with respect to the wire harness main body 11 from the straight section 11A.

(3) The insertion port 42 of the first route-regulating member 40 is open in a direction orthogonal to the lengthwise direction of the first route-regulating member 40 and extends along the entire length in the lengthwise direction of the first route-regulating member 40. This makes it possible to attach the first route-regulating member 40 from the insertion port 42 to the outer cover member 30 after performing terminal processing such as attaching connectors C1 and C2 to the end portions in the lengthwise direction of the electric wire members 20. In this manner, since the first route-regulating member 40 can be retrofitted, it is possible to make the wire harness 10 more easy to assemble.

(4) The covering portion 51 is formed in a ring shape that collectively encloses the connecting portion 47 and the outer cover member 30. The covering portion 51 has the second main body portion 52 that covers a portion of the outer circumference of the first main body portion 41, and the lid portion 56 that is coupled to the second main body portion 52. According to this configuration, the second route-regulating member 50 including the covering portion 51 can be retrofitted to the first route-regulating member 40 and the outer cover member 30 due to the covering portion 51 having a ring shape enclosing the connecting portion 47 and the outer cover member 30 while the covering portion 51 is divided into the second main body portion 52 and the lid portion 56. As a result, it is possible to make the wire harness 10 much easier to assemble.

(5) The regulating wall 60 has the main-body-side regulating wall 61 that protrudes from the inner surface of the second main body portion 52, and the lid-side regulating wall 62 that protrudes from the inner surface of the lid portion 56. According to this configuration, if the first route-regulating member 40 is first inserted into the second main body portion 52, the end surface 47A in the lengthwise direction of the first route-regulating member 40 can be engaged with the main-body-side regulating wall 61. Also, if the first route-regulating member 40 is first inserted into the lid portion 56, the end surface 47A in the lengthwise direction of the first route-regulating member 40 can be engaged with the lid-side regulating wall 62. As a result, regardless of whether the first route-regulating member 40 is first inserted into either the second main body portion 52 or the lid portion 56, the first route-regulating member 40 can be easily positioned with respect to the second route-regulating member 50.

(6) The opening width of the second accommodation port 63 provided in the main-body-side regulating wall 61 is smaller than the outer diameter of the first route-regulating member 40. Thus, if the first route-regulating member 40 is inserted into the covering portion 51, the end surface 47A in the lengthwise direction of the first route-regulating member 40 can be suitably engaged with the main-body-side regulating wall 61. As a result, the first route-regulating member 40 can be suitably positioned with respect to the second route-regulating member 50.

(7) The covering portion 51 has the projecting portion 65 that can come into contact with at least one of the first end portion 43 and the second end portion 44 that form the insertion port 42 in the circumferential direction of the first route-regulating member 40. For this reason, the projecting portion 65 and the first end portion 43 or the second end portion 44 are engaged with each other in the circumferential direction of the first route-regulating member 40. Due to the engagement between these portions, relative movement of the first route-regulating member 40 with respect to the covering portion 51 is suppressed in the circumferential direction of the first route-regulating member 40. That is, due to the projecting portion 65 and the first end portion 43 or the second end portion 44 being engaged with each other, it is possible to suppress rotation of the first route-regulating member 40 in the circumferential direction with respect to the covering portion 51. For this reason, it is possible to suppress positional misalignment of the first route-regulating member 40 with respect to the covering portion 51 in the circumferential direction of the first route-regulating member 40, and the positional accuracy of the first route-regulating member 40 with respect to the covering portion 51 can be improved.

(8) Since the projecting portion 65 has protrusions 66 that enter the ring-shaped recesses 32 of the outer cover member 30, it is possible to suppress movement of the outer cover member 30 with respect to the second route-regulating member 50 in the lengthwise direction of the outer cover member 30.

(9) The regulating wall 60 is provided at the end portion that is connected to the route-regulating portion 70, out of the two end portions in the lengthwise direction of the covering portion 51. This regulating wall 60 regulates the amount by which the first route-regulating member 40 is inserted into the second route-regulating member 50 in the lengthwise direction of the wire harness main body 11. Thus, it is possible to inhibit the first route-regulating member 40 from being inserted to the route-regulating portion 70 of the second route-regulating member 50 in the lengthwise direction of the wire harness main body 11. That is, it is possible to inhibit the first route-regulating member 40 from being excessively inserted into the second route-regulating member 50 in the lengthwise direction of the wire harness main body 11.

(10) The route of the straight section 11A is regulated by the first route-regulating member 40, and the route of the bent section 11B is regulated by the second route-regulating member 50. As a result, it is possible to prevent the route of the straight section 11A and the route of the bent section 11B from deviating from the desired routes.

(11) The first route-regulating member 40 has the protruding portion 45 that protrudes from the inner surface of at least one of the first end portion 43 and the second end portion 44 and can come into contact with the outer surface of the outer cover member 30. With this protruding portion 45, for example, the outer cover member 30 can be pressed from the outer side of the outer cover member 30. For this reason, detachment of the first route-regulating member 40 from the outer cover member 30 through the insertion port 42 can be suitably suppressed.

Other Embodiments

The above embodiment can be modified and implemented as follows. The above embodiment and the following modifications can be implemented in combination with each other as long as no contradiction arises.

Although a gap is formed between the inner surface of the lid portion 56 and the outer surface of the first route-regulating member 40 in the above embodiment, the present disclosure is not limited to this.

Figure 7:
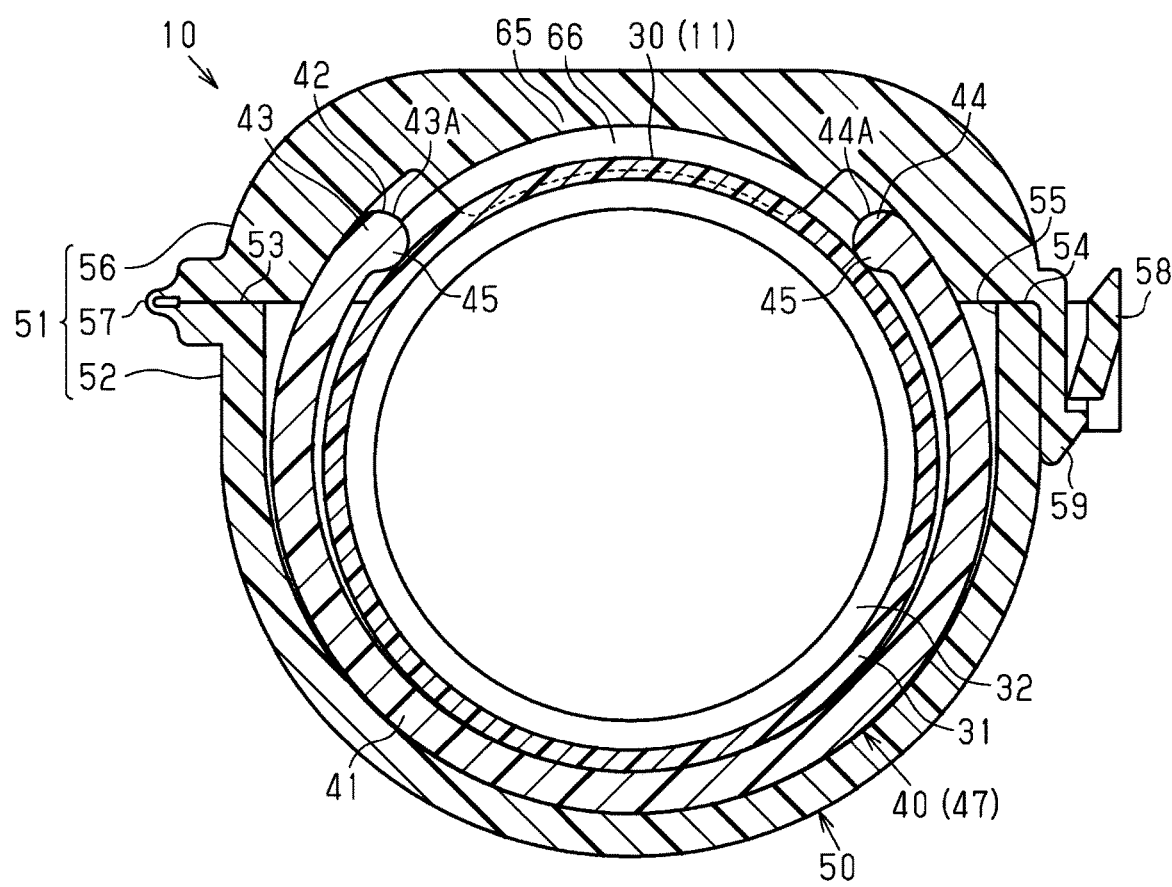
FIG. 7 is a schematic cross-sectional view showing a wire harness according to a modified example.

As shown in FIG. 7, for example, the inner surface of the lid portion 56 may be in intimate contact with the outer surface of the first route-regulating member 40. The inner surface of the lid portion 56 may be formed so as to press the outer surface of the first route-regulating member 40 inward in the radial direction of the covering portion 51, for example.

As shown in FIG. 8, for example, a fastening allowance may be provided between the outer circumference of the first route-regulating member 40 and the inner circumference of the covering portion 51. The smallest inner diameter d2 of the covering portion 51 may be formed smaller than the largest outer diameter d1 of the route-regulating member 40 before being inserted into the covering portion 51 in a state of being attached to the outer circumference of the outer cover member 30, for example. Here, the first route-regulating member 40 in this modified example is configured such that, in a state in which the outer cover member 30 is inserted therein, the opening width of the insertion port 42 is slightly larger than its original width, that is, the width thereof when the outer cover member 30 is not inserted. In a state in which the outer cover member 30 is inserted into the first route-regulating member 40, the outer diameter of the first route-regulating member 40 in this modified example is larger than the outer diameter thereof when the outer cover member 30 is not inserted by a protrusion amount of the protruding portion 45, for example. Thus, the largest outer diameter d1 in this modified example is the outer diameter of a portion of the first route-regulating member 40 that passes the protruding portion 45 before being inserted into the covering portion 51 in a state of being attached to the outer circumference of the outer cover member 30. Also, the smallest inner diameter d2 of this modified example is the inner diameter of the covering portion 51 at a position corresponding to the largest outer diameter d1. The smallest inner diameter d2 is set smaller than the largest outer diameter d1 by a protrusion amount of the protruding portion 45, for example.

Because the largest outer diameter d1 and the smallest inner diameter d2 are set in this manner, the first route-regulating member 40 attached to the outer circumference of the outer cover member 30 is fitted to the inner circumference of the covering portion 51 with the fastening allowance interposed therebetween. As shown in FIG. 7, when the lid portion 56 is held at the closed position in a state in which the outer cover member 30 and the first route-regulating member 40 are accommodated in the covering portion 51, the first route-regulating member 40 is fitted and fixed to the inner circumference of the covering portion 51 with the fastening allowance interposed therebetween, for example. As a result, the inner circumferential surface of the covering portion 51 and the outer circumferential surface of the first route-regulating member 40 are in contact with each other in a state in which the fastening allowance is present therebetween. In this modified example, the inner circumferential surface of the covering portion 51 and the outer circumferential surface of the first route-regulating member 40 are in contact with each other in a state in which the fastening allowance is present therebetween only at a plurality of positions spaced apart from each other in the circumferential direction of the covering portion 51. As a result, the first route-regulating member 40 fitted into the covering portion 51 is held in a state of being constantly pressed inward in the radial direction of the covering portion 51 by the inner surface of the covering portion 51. Therefore, rattling of the first route-regulating member 40 in the covering portion 51 can be suppressed. Also, relative movement of the first route-regulating member 40 with respect to the covering portion 51 is favorably suppressed in the lengthwise direction of the wire harness main body 11. For this reason, it is possible to suitably suppress positional misalignment of the first route-regulating member 40 with respect to the covering portion 51 in the lengthwise direction of the wire harness main body 11, and to suitably suppress detachment of the first route-regulating member 40 from the covering portion 51. Further, relative movement of the first route-regulating member 40 with respect to the covering portion 51 is also suitably suppressed in the circumferential direction of the wire harness main body 11.

Note that the electric wire member 20 is not shown in FIGS. 7 and 8.

The structure of the second route-regulating member 50 of the above-described embodiment can be changed as appropriate. For example, as long as the second route-regulating member 50 has a structure that covers the connecting portion 47 and has the covering portion 51 provided with the regulating wall 60, there is no particular limitation on the other structures.

Although the projecting portion 65 is provided on the inner surface of the lid portion 56 in the above embodiment, the present disclosure is not limited to this, and the projecting portion 65 may be provided on the inner surface of the second main body portion 52. In this case, when the projecting portion 65 provided on the inner surface of the second main body portion 52 is inserted into the insertion port 42 of the first route-regulating member 40, the projecting portion 65 is positioned so as to face the second main body portion 52 side of the covering portion 51 at a position in the circumferential direction of the insertion port 42 of the first route-regulating member 40, for example.

The protrusions 66 of the lid portion 56 may also be omitted.

The projecting portion 65 of the lid portion 56 may also be omitted.

Either the main-body-side regulating wall 61 or the lid-side regulating wall 62 may also be omitted.

In the covering portion 51 of the above-described embodiment, the second main body portion 52 and the lid portion 56 are formed in one piece with each other, but there is no limitation to this, and the second main body portion 52 and the lid portion 56 may also be separate from each other. That is, the second main body portion 52 and the lid portion 56 may be separate components.

The lid portion 56 of the covering portion 51 may also be omitted.

The bent shape of the route-regulating portion 70 can be changed as appropriate.

The transverse cross-sectional shape of the inner surface of the second main body portion 52 and the third main body portion 71 is not limited to a U shape, and can be changed to, for example, an arc shape, an elliptical arc shape, or the like.

A lid portion to be coupled to the third main body portion 71 may be provided.

The second route-regulating member 50 of the above-described embodiment was formed so as to regulate the route of the bent section 11B of the wire harness main body 11, but there is no limitation to this. For example, the second route-regulating member 50 may be changed to a shape that regulates the route of the straight section 11A of the wire harness main body 11. The second route-regulating member 50 in this case is changed to, for example, a shape in which the bent shape of the route-regulating portion 70 extends linearly.

In the above-described embodiment, the second route-regulating member 50 is embodied as an attachment member (attachment) having a covering portion 51, but there is no limitation to this. For example, the attachment member may be embodied in a structure having only the covering portion 51.

The structure of the first route-regulating member 40 of the above-described embodiment can be changed as appropriate. For example, as long as the first route-regulating member 40 has the insertion port 42 and has a structure with which the first route-regulating member 40 can be attached to the outer circumference of the outer cover member 30, there is no particular limitation to the other structures.

Each protruding portion 45 of the above-described embodiment may be provided at a position farther from the insertion port 42 than the leading ends 43A and 44A in the circumferential direction of the first route-regulating member 40.

Each protruding portion 45 may be partially provided in the lengthwise direction of the first route-regulating member 40.

At least one of the two protruding portions 45 may be omitted.

The first route-regulating member 40 may be provided with a second protruding portion that protrudes from the inner surface of the intermediate portion in the circumferential direction of the first main body portion 41 and can come into contact with the outer surface of the outer cover member 30. According to this configuration, the protruding portion 45 and the second protruding portion can be brought into contact with the outer surface of the outer cover member 30 together. Therefore, rattling of the first route-regulating member 40 can be suppressed.

In the first route-regulating member 40, a groove extending along the lengthwise direction may be provided on the outer surface of the first main body portion 41. According to this configuration, the first main body portion 41 is easily deformed to the outer peripheral side using the groove as a starting point, whereby the insertion opening 42 can be more easily expanded. As a result, it is possible to contribute to making the first route-regulating member 40 easier to attach.

The thickness in the radial direction of the first main body portion 41 may be changed in the circumferential direction.

The transverse cross-sectional shape of the first main body portion 41 is not limited to an arc shape, but can be changed to, for example, an elliptical arc shape, a U shape, or the like.

In the above-described embodiment, the first route-regulating member 40 and the second route-regulating member 50 are more rigid than the outer cover member 30, but there is no limitation to this, and the hardness may be less than or equal to that of the outer cover member 30. That is, if the first route-regulating member 40 and the second route-regulating member 50 act so that the wire harness main body 11 is less likely to bend than the wire harness main body 11 in the state where the first route-regulating member 40 and the second route-regulating member 50 are not attached, the first route-regulating member 40 and the second route-regulating member 50 need not be more rigid than the outer cover member 30.

The second route-regulating members 50 may also be provided on two sides in the lengthwise direction of the first route-regulating member 40 in the above embodiment.

At least one of the fixing members 81 and 82 in the above-described embodiment may be omitted.

For example, the outer cover member 30 in the above-described embodiment may be a resin corrugated tube with a metal layer that contains a metal material, formed on the outer surface thereof.

The outer cover member 30 in the above-described embodiment is not limited to being a corrugated tube, and may be an outer cover member that is not provided with an annular protrusion 31 or an annular recess 32, for example.

The outer cover member 30 in the above-described embodiment may have a slit that extends in the lengthwise direction of the outer cover member 30.

Although the electric wires 21 in the above-described embodiment are high-voltage electric wires, the present disclosure is not limited to such a configuration. For example, the electric wires 21 may be low-voltage electric wires.

In the electric wire member 20 in the above-described embodiment, an electromagnetic shield member is embodied as the braided member 25. However, the present disclosure is not limited to such a configuration. For example, the electromagnetic shield member in the electric wire member 20 may be embodied as a metal foil.

The braided member 25 of the electric wire member 20 in the above-described embodiment may be omitted.

In the above-described embodiment, the number of electric wires 21 included in the electric wire member 20 is two. However, the present disclosure is not limited to such a configuration. The number of electric wires 21 may be one or three or more.

The positional relationship between the inverter M1 and the high-voltage battery M2 in the vehicle V is not limited to that in the above-described embodiment, and may be changed as appropriate depending on the vehicle configuration.

In the above-described embodiment, a plurality of on-board devices to which the wire harness 10 is to be electrically connected are embodied as the inverter M1 and the high-voltage battery M2. However, the present disclosure is not limited to such a configuration. The plurality of on-board devices to which the wire harness 10 is to be electrically connected are not particularly limited as long as they are electric devices to be mounted in the vehicle V.

The embodiments disclosed herein are illustrative in all aspects and should not be considered restrictive. The scope of the present disclosure is indicated by the scope of claims, not the above-mentioned meaning, and is intended to include all modifications within the meaning and scope equivalent to the scope of claims.

What is claimed is:

1. A wire harness comprising:
   a wire harness main body including an electric wire and an outer cover enclosing an outer circumference of the electric wire;

a route-regulating cover that is attached to an outer circumference of the outer cover and is configured to route the wire harness main body; and an attachment attached to an outer circumference of a portion in a lengthwise direction of the route-regulating cover, wherein the route-regulating cover includes a first main body that covers a portion of the outer circumference of the outer cover, and an insertion port that is open in a direction orthogonal to a lengthwise direction of the first main body and extends along an entire length in the lengthwise direction of the first main body, the route-regulating cover includes a connection that is connected to the attachment, the attachment includes a cover that covers an outer circumference of the connection, the cover includes a regulating wall that is engageable with an end surface in the lengthwise direction of the route-regulating cover in a lengthwise direction of the wire harness main body, a transverse cross-sectional shape of the route-regulating cover covers a range larger than half of the outer circumference of the outer cover, the route-regulating cover is a first route-regulating cover, the attachment is a second route-regulating cover that is attached to the outer circumference of the outer cover and has a route-regulating portion that regulates the route of the wire harness main body, the connection is provided at an end in the lengthwise direction of the first route-regulating cover, the second route-regulating cover is formed such that the cover and the route-regulating portion are continuous with each other in the lengthwise direction of the wire harness main body, the cover is provided at an end in a lengthwise direction of the second route-regulating cover, and the regulating wall is provided at an end that is connected to the route-regulating portion, out of two ends in a lengthwise direction of the cover.

2. The wire harness according to claim 1, wherein:
the cover is formed in a ring shape enclosing all the way around the outer circumference of the connection and the outer circumference of the outer cover at a portion to which the connection is attached, and
the cover includes a second main body that covers a portion of an outer circumference of the first main body and a lid that is coupled to the second main body.

3. The wire harness according to claim 2, wherein the regulating wall includes a main-body-side regulating wall that protrudes from an inner surface of the second main body inward in a radial direction of the cover, and a lid-side regulating wall that protrudes from an inner surface of the lid inward in the radial direction of the cover.

4. The wire harness according to claim 3, wherein:
the second main body has a first accommodation port that is open in a direction orthogonal to a lengthwise direction of the second main body,
the main-body-side regulating wall is formed over an entire circumference of the second main body, in a circumferential direction of the cover,
the main-body-side regulating wall has a second accommodation port that is open in a direction orthogonal to the lengthwise direction of the second main body and is in communication with the first accommodation port,
an opening width of the second accommodation port is smaller than an opening width of the first accommodation port, and
the opening width of the second accommodation port is smaller than an outer diameter of the route-regulating cover.

5. The wire harness according to claim 2, wherein:
the route-regulating cover includes a first end and a second end that are two ends in a circumferential direction of the first main body and form the insertion port,
the cover has a projection that protrudes from an inner surface of the cover to the insertion port, and
the projection is able to come into contact with at least one of the first end and the second end in a circumferential direction of the route-regulating cover.

6. The wire harness according to claim 5, wherein:
the outer cover is a corrugated tube having an accordion structure in which a ring-shaped protrusion and a ring-shaped recess are alternatingly continuous with each other in a lengthwise direction of the outer cover, and
the projection has a protrusion that enters the ring-shaped recess.

7. The wire harness according to claim 2, wherein a fastening allowance is provided between an outer circumference of the route-regulating cover and an inner circumference of the cover.

8. The wire harness according to claim 1, wherein:
the first route-regulating cover regulates the route of a straight section, which is a section having a linear shape in the route of the wire harness main body, and
the second route-regulating cover regulates the route of a bend, which is a section that is bent in the route of the wire harness main body.

* * * * *